(12) United States Patent
Maximiuc

(10) Patent No.: US 10,870,419 B2
(45) Date of Patent: Dec. 22, 2020

(54) EPB LOW RESIDUAL TORQUE SOFTWARE FUNCTION

(71) Applicant: Continental Automotive Systems, Inc., Auburn Hills, MI (US)

(72) Inventor: Fábio Niza Maximiuc, Lake Orion, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/041,150

(22) Filed: Jul. 20, 2018

(65) Prior Publication Data

US 2020/0023826 A1    Jan. 23, 2020

(51) Int. Cl.
| | |
|---|---|
| *B60T 13/14* | (2006.01) |
| *B60T 13/66* | (2006.01) |
| *B60T 1/06* | (2006.01) |
| *B60T 7/08* | (2006.01) |
| *B60T 13/74* | (2006.01) |

(52) U.S. Cl.
CPC ............ *B60T 13/662* (2013.01); *B60T 1/065* (2013.01); *B60T 7/08* (2013.01); *B60T 13/142* (2013.01); *B60T 13/741* (2013.01)

(58) Field of Classification Search
CPC ........ B60T 7/085; B60T 7/107; B60T 13/588; B60T 13/741; B60T 13/745
See application file for complete search history.

(56) References Cited

U.S. PATENT DOCUMENTS

| | | | | |
|---|---|---|---|---|
| 3,944,028 | A * | 3/1976 | Haraikawa | F16D 55/226 188/72.5 |
| 4,778,222 | A * | 10/1988 | Numata | B60T 8/262 303/113.5 |
| 5,735,585 | A * | 4/1998 | Koike | B60T 8/175 303/145 |
| 5,927,824 | A * | 7/1999 | Pahl | B60T 8/38 303/113.2 |
| 6,286,635 | B1 * | 9/2001 | Tamor | B60L 7/26 180/65.21 |

(Continued)

FOREIGN PATENT DOCUMENTS

| | | |
|---|---|---|
| JP | 2010241389 A * | 10/2010 |
| WO | WO-2013180107 A1 * | 12/2013 |

OTHER PUBLICATIONS

Translation of JP2010-241389, retrieved from patentscope (Year: 2019).*

(Continued)

*Primary Examiner* — Bradley T King

(57) ABSTRACT

An electronic parking brake (EPB) system having expanded functionality, such that after a Hydraulic Electronic Control Unit (HECU) (i.e., host) commands the parking brake units to release clamping force on the brake discs, a pressure differential is generated in the rear calipers. When the normally closed valves at the HECU are opened, fluid is transferred to a low-pressure accumulator, transferring the brake fluid from the housing of the caliper. A pump is then activated to further draw fluid from the accumulator and the caliper, transferring the fluid back to the master cylinder. The suction created by the activation of the pump moves the caliper piston towards the housing and the brake pad away from the brake disc, and achieving the desired air gap.

15 Claims, 3 Drawing Sheets

(56) References Cited

U.S. PATENT DOCUMENTS

| | | | | |
|---|---|---|---|---|
| 6,481,805 | B1* | 11/2002 | Ichinose | B60T 7/042 |
| | | | | 188/72.3 |
| 6,609,594 | B1* | 8/2003 | Charmat | F16D 55/22655 |
| | | | | 188/73.37 |
| 7,527,339 | B2* | 5/2009 | Iizuka | B60T 7/12 |
| | | | | 303/11 |
| 8,602,508 | B2* | 12/2013 | Lavoie | B60T 8/1755 |
| | | | | 303/155 |
| 8,914,211 | B2* | 12/2014 | Watanabe | B60T 8/4872 |
| | | | | 701/70 |
| 9,889,835 | B1* | 2/2018 | Antanaitis | B60T 8/4225 |
| 2007/0216218 | A1* | 9/2007 | Matsushita | B60T 7/042 |
| | | | | 303/20 |
| 2008/0265663 | A1* | 10/2008 | Leach | B60T 8/00 |
| | | | | 303/10 |
| 2009/0183958 | A1* | 7/2009 | Sano | B60T 8/00 |
| | | | | 188/204 R |
| 2013/0116904 | A1 | 5/2013 | Watanabe et al. | |
| 2013/0257142 | A1 | 10/2013 | Kim et al. | |
| 2014/0284151 | A1* | 9/2014 | Yokoyama | B60T 13/588 |
| | | | | 188/72.3 |
| 2015/0115697 | A1* | 4/2015 | Yamamoto | B60T 7/042 |
| | | | | 303/3 |
| 2015/0183412 | A1* | 7/2015 | Lim | B60T 8/58 |
| | | | | 303/155 |

OTHER PUBLICATIONS

International Search Report and Written Opinion dated Oct. 16, 2019 from corresponding International Patent Application No. PCT/US2019/042220.

* cited by examiner

EPB LOW RESIDUAL TORQUE SOFTWARE FUNCTION

FIELD OF THE INVENTION

The invention relates generally to a braking system which is able to be configured to reduce residual torque to the rear wheels after application of the electronic parking brake, thereby improving fuel economy.

BACKGROUND OF THE INVENTION

Many current vehicles are equipped with an electronic parking brake (EPB). An EPB generally includes some type of brake unit having an electronic actuator in electrical communication with an electronic control unit (ECU), and there is also some type of switch which is selectively actuated by the driver of the vehicle for controlling the actuation of the EPB. The driver actuates the switch when desired such that a signal is sent to the ECU, and the ECU then sends a signal to the actuator to engage the brake unit, preventing the vehicle from moving.

During operation of a vehicle having a hydraulic braking system, application of the standard foundation brakes is obtained by a pressure build-up controlled by the HECU. This creates a significant pressure differential between the brake lines and a low-pressure accumulator (LPA). The brakes are then released in a relatively short period of time, as compared to parking brake application. When the foundation brakes are released, valves are switched to allow fluid communication between the brake calipers and the LPA. The pressure differential equalizes, and the pistons in the calipers are retracted as a result. However, when the brakes have been applied using the EPB there is insufficient pressure differential between the HECU and the LPA to achieve the same effect, which may result in drag or residual torque in the braking units.

Automobile manufacturers desire to reduce residual torque in all vehicle platforms to help improve fuel economy. Furthermore, automobile manufacturers have also increased residual torque requirements, making the reduction in residual torque more difficult to achieve using mechanical components. Current read brake calipers with an integrated EPB provide a "low air gap" after release of the EPB due to the deformations at the housing assembly during the application of the EPB. This low air gap increases the residual torque in the rear wheels, reducing the fuel economy. Nominal air gap is recovered after several service applications, but the time to when the nominal air gap is achieved depends upon the customer usage, and driving habits.

Accordingly, there exists a need for an EPB system which has expanded functionality, such that the PBC software allows a fast air gap recovery, providing low residual torque and increasing vehicle fuel economy

SUMMARY OF THE INVENTION

The present invention is an electronic parking brake (EPB) system for a vehicle, where the EPB has expanded functionality. After a Hydraulic Electronic Control Unit (HECU) (i.e., host) commands the parking brake units to release clamping force on the brake discs, a pressure differential is generated in the rear calipers. When the normally closed valves at the HECU are opened, fluid is transferred to a low-pressure accumulator, transferring the brake fluid from the housing of the caliper. A pump is then activated to further draw fluid from the accumulator and the caliper, transferring the fluid back to the master cylinder. The suction created by the activation of the pump moves the caliper piston towards the housing and the brake pad away from the brake disc, and achieving the desired air gap.

In one embodiment, after the driver actuates the EPB release command through the parking brake switch (or any EPB automated function, such as drive away release (DAR)), the HECU generates low pressure (such as 5 bar) at the rear calipers. After pressure builds in the calipers, the HECU configures various valves to open and other valves to close, such that the brake fluid in the caliper flows to the low-pressure accumulator prior to activation of the pump. Once the pump is activated, the piston is moved towards the caliper and the brake pads away from the brake disc, creating additional air gap.

In one embodiment, the present invention is a braking system, having a hydraulic electronic control unit (HECU), a switch in electrical communication with the hydraulic electronic control unit, and at least one brake unit operable for being controlled by the hydraulic electronic control unit.

The brake unit includes at least one actuator in electrical communication with the electronic control unit, at least one disc, the actuator operable for selectively applying a force to the disc, at least one caliper operable for selectively applying a force to the disc, and at least one brake pad connected to the caliper, the brake pad selectively in contact with the disc.

The braking system also includes at least one low-pressure accumulator in fluid communication with the at least one caliper, and a pump in fluid communication with the caliper and the low-pressure accumulator.

To reduce drag or residual torque in the brake unit, the switch is configured such that the actuator releases the disc, such that the brake unit is exposed to pressurized fluid, creating a pressure differential between the low-pressure accumulator and the caliper. The pressure differential causes fluid in the caliper to be transferred to the low-pressure accumulator. The hydraulic electronic control unit then activates the pump, causing fluid to transfer away from the caliper and the low-pressure accumulator, moving the at least one brake pad away from the at least one disc, creating a gap between the at least one brake pad and the at least one disc, reducing drag torque.

The braking system of the present invention also includes a master cylinder, and fluid is transferred from the at least one low-pressure accumulator and the at least one caliper to the master cylinder during the operation of the pump.

As the at least one disc rotates when the vehicle moves from a stopped position, a portion of the gap is located between the second brake pad and the disc. More specifically, the brake disc runout causes the gap to be spaced on both sides of the disc, further reducing drag torque.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
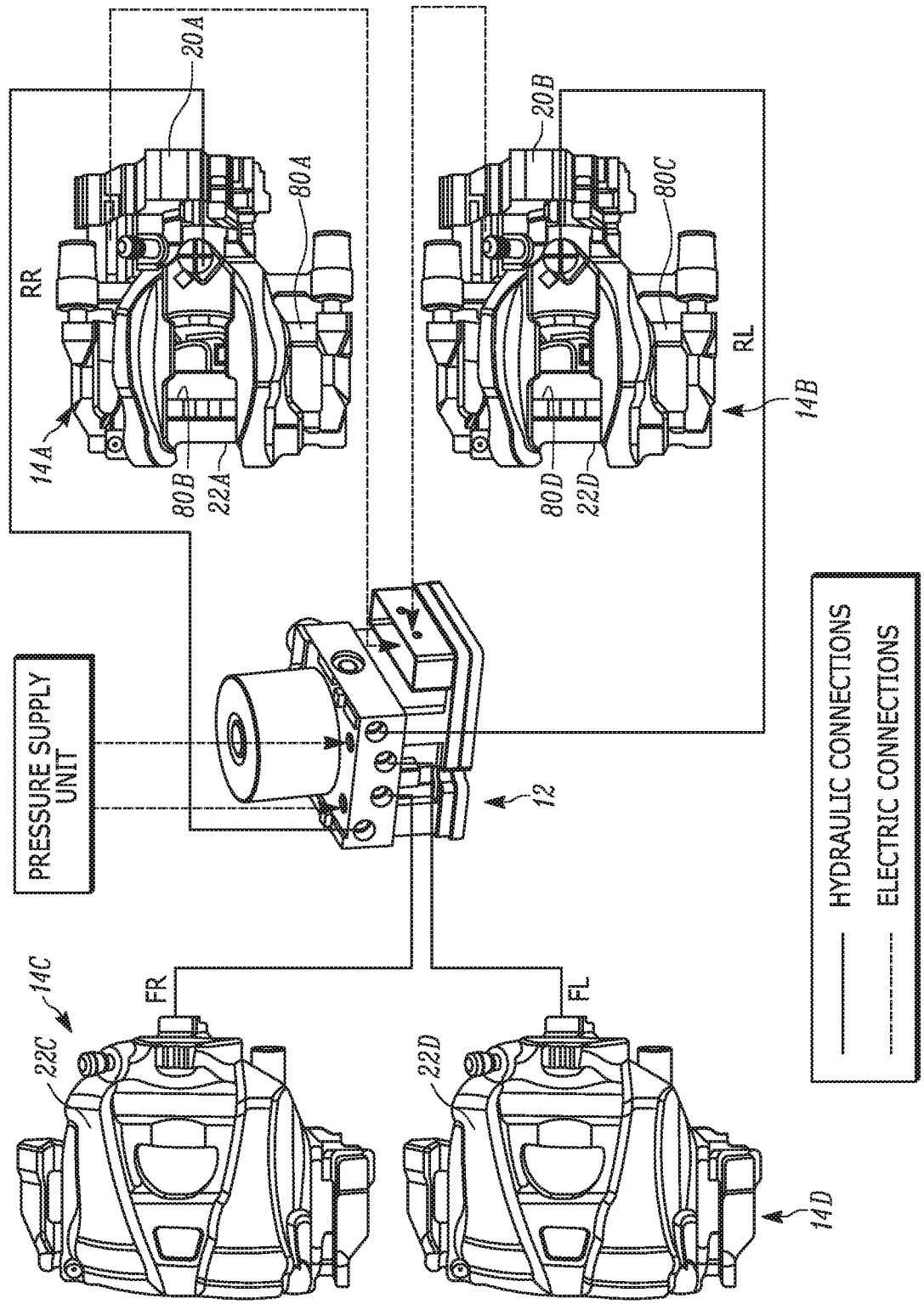
FIG. 1 is a diagram of a brake system for a vehicle, where the brake system has an EPB low residual torque software function, according to embodiments of the present invention.

A diagram showing a braking system having an electronic parking brake (EPB) low residual torque software function according to the present invention is shown in FIG. 1, generally at 10. Referring to the Figures generally, the braking system 10 includes a hydraulic electronic control unit (HECU) 12, and the HECU 12 is in electrical communication with at least one brake unit, which in this embodiment is two rear brake units, shown generally at 14A,14B, which are part of a rear brake system, shown generally at 16A. The brake system 10 also includes two front brake units 14C,14D, which are part of a front brake system, shown generally at 16B. Each brake unit 14A,14B,14C,14D is able to prevent the rotation of a corresponding rotatable element, which in this embodiment are discs 18A,18B,18C, 18D connected a corresponding wheel (not shown).

Each rear brake unit 14A,14B includes an electronic actuator 20A,20B, and each electronic actuator 20A,20B is connected to and is able to actuate a corresponding caliper 22A,22B. Each caliper 22A,22B has two brake pads 80A, 80B,80C,80D located on opposite sides of each corresponding disc 18A,18B, and each electronic actuator 20A,20B is able to configure a corresponding caliper 22A,22B to apply force to the brake pads 80A,80B,80C,80D. More specifically, the first actuator 20A is able to control the operation of the first caliper 22A such that the pads 80A,80B apply force to the first disc 18A, limiting or preventing rotation of the first disc 18A. The second actuator 20B is able to control the operation of the second caliper 22B such that the pads 80C,80D apply force to the second disc 18B, limiting or preventing rotation of the second disc 18B.

The HECU 12 includes software such that the HECU 12 is programmed to command the actuators 20A,20B to generate a requested clamping force on the discs 18A,18B. In one embodiment, the actuators 20A,20B are motor-gear-units, each of which includes a DC motor connected to a gear box for torque amplification. Each gear box also includes a spindle nut and ball screw mechanism (or any similar mechanical assembly) connected to a piston, where each piston is mounted in a corresponding caliper 22A,22B. Although the actuator 20A,20B has been described as a motor-gear-unit, it is within the scope of the invention that other types of actuators may be used, such as, but not limited to, a stand-alone DC motor (no gear box), a brushless DC motor, a stepper motor, or the like.

The EPB system 10 also includes a switch 24, which is also in electrical communication with the HECU 12. The switch 24 is used to actuate the brake units 14A,14B. The switch 24 has two positions, in the first position, or "off position," the switch 24 is configured such that the HECU 12 does not send a signal to the actuators 20A,20B, and no force is applied to the discs 18A,18B. When the switch 24 is in the off position, the actuators 20A,20B configure the calipers 22A,22B to release the discs 18A,18B, such that the discs 18A,18B, and therefore the wheels, are allowed to rotate freely. In the second position, or "on position," the switch 24 is configured to send a signal to the HECU 12, and a signal corresponding to maximum clamping force is sent from the HECU 12 to each actuator 20A,20B, and the clamping force is generated by the actuators 20A,20B is maximized. When the switch 24 is in the on position, the clamping force applied to the discs 18A,18B by the actuators 20A,20B is maximized, and the discs 18A,18B, and therefore the wheels, are stationary, and are prevented from rotating. The switch 24 may be used when the vehicle is in a parked location, and it is desired to prevent the vehicle from moving, such as when the vehicle is parked on a hill.

The brake system 10 also includes a tandem master cylinder (TMC), shown generally at 26. The TMC 26 is divided into various cavities, and has two pistons, one of which is connected to a connecting rod 28, and the connecting rod 28 is connected to and actuated by a brake pedal 30. There is a first primary feed conduit 32A connected to and in fluid communication with the rear brake system 16A and the TMC 26, and a second primary feed conduit 32B connected to and in fluid communication with the front brake system 16B and the TMC 26.

More specifically, the first primary feed conduit 32A is connected to and in fluid communication with a first accumulator 34. The first primary feed conduit 32A splits, and is in fluid communication with a first valve 36 and a second valve 38, where the second valve 38 includes a check valve 38A to provide for pressure relief. The first valve 36 is also connected to and in fluid communication with a second conduit 40, and connected to and in fluid communication with the second conduit 40 is a second accumulator 42. Also disposed in the second conduit 40 is another check valve 44. A third conduit 46 is connected to and in fluid communication with the second conduit 40, and disposed in the third conduit 46 are two more check valves 48,50, and a pump 52 disposed between the two check valves 48,50. Also disposed in the third conduit 46 is another accumulator 54 and a restriction point 56.

Connected to and in fluid communication with the second valve 38 is a third conduit 58, and the third conduit 58 also extends and is connected to and in fluid communication with the second conduit 40. Disposed in the third conduit 58 is a third valve 60 and a fourth valve 62, and the third valve 60 includes a check valve 60a to provide relief of excess pressure. Also connected to and in fluid communication with the second conduit 40 is a low-pressure accumulator 64.

Connected to and in fluid communication with the third conduit 58 is a fourth conduit 66, and the fourth conduit 66 is also connected to and in fluid communication with the second conduit 40. The third conduit 46 is also connected to and in fluid communication with the fourth conduit 66, at a location downstream of the restriction point 56. Disposed in the fourth conduit 66 is a fifth valve 68 and a sixth valve 70, where the sixth valve 70 includes a check valve 70A.

Connected to and in fluid communication with the fourth conduit 66 is a first final conduit 72A, the first final conduit 72A is connected to the fourth conduit 66 between the fifth valve 68 and the sixth valve 70. The first final conduit 72A is also connected to and in fluid communication with the first caliper 22A, such that the first caliper 22A is able to be pressurized by fluid from the first final conduit 72A.

Connected to and in fluid communication with the third conduit 58 is a second final conduit 72B, the second final conduit 72B is connected to the third conduit 58 between the third valve 60 and the fourth valve 62. The second final conduit 72B is also connected to and in fluid communication with the second caliper 22B, such that the second caliper 22B is able to be pressurized by fluid from the second final conduit 72B.

Figure 3:
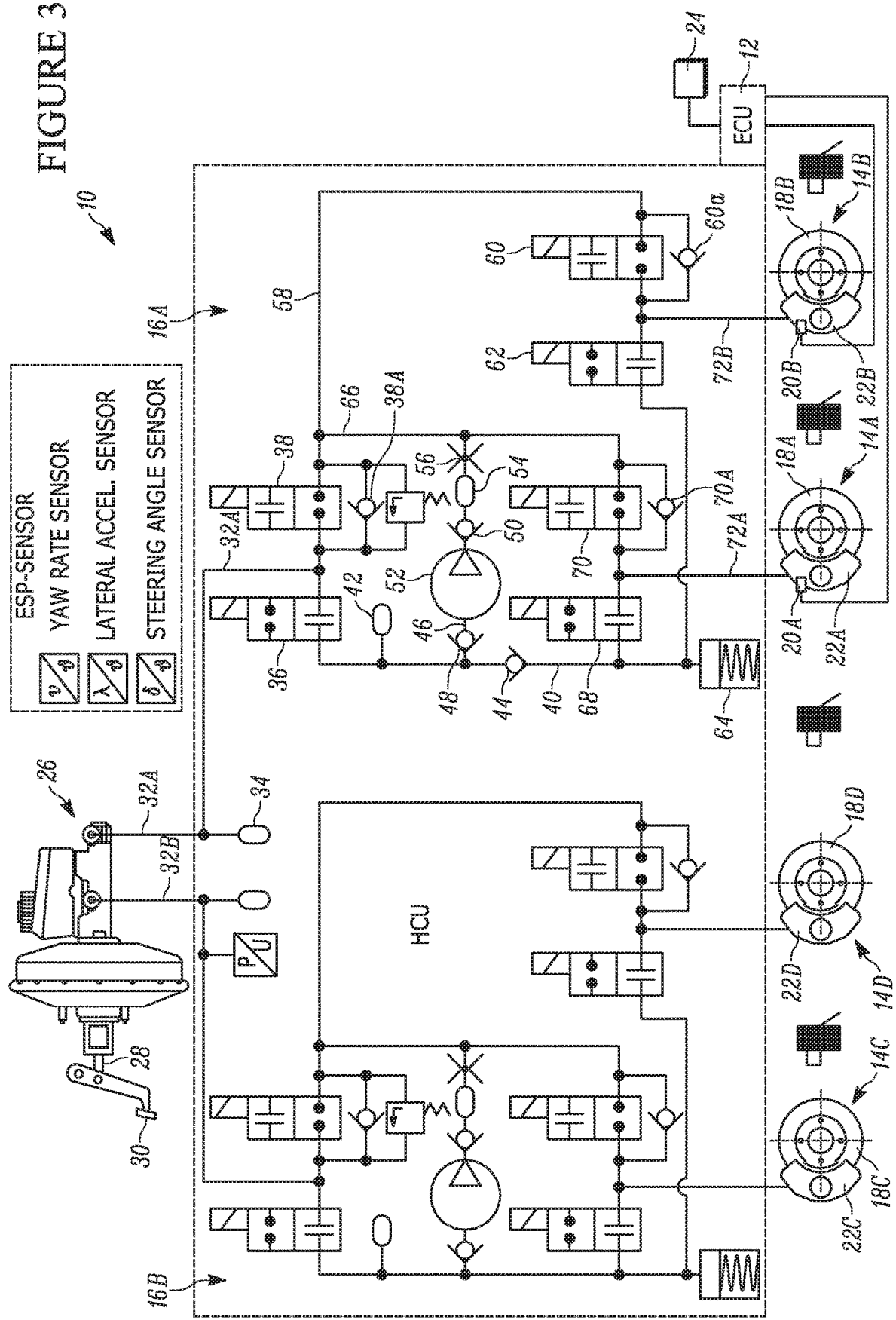
FIG. 3 is a diagram of a brake system for a vehicle, where the brake system has an EPB low residual torque software function, according to embodiments of the present invention.

In operation, as mentioned above, the switch 24 is used to control the actuators 20A,20B, and perform the parking brake functions. When the switch 24 is changed from the second configuration to the first configuration as shown in FIG. 3, the actuators 20A,20B configure the calipers 22A, 22B to release the discs 18A,18B, such that the discs 18A,18B, and therefore the wheels, are allowed to rotate freely, as described above. However, the brake pads 80A, 80B,80C,80D may not fully retract, resulting in brake drag, or drag torque, applied to each of the brake units 14A,14B.

To reduce or eliminate the possibility of brake drag, the brake system 10 is configured to move the brake pads 80A,80C away from each corresponding disc 18A,18B. This is achieved after operating the brake system 10 in various stages, shown particularly in FIG. 2, where brake fluid is transferred to each caliper 22A,22B, a pressure differential between the low-pressure accumulator 64 and the calipers 22A,22B causes brake fluid to be transferred away from each caliper 22A,22B, and then the pump 52 is activated to further transfer fluid away from each caliper 22A,22B, creating a suction, which then moves each piston and corresponding brake pad 80A,80C away from the corresponding brake disc 18A,18B.

Figure 2:
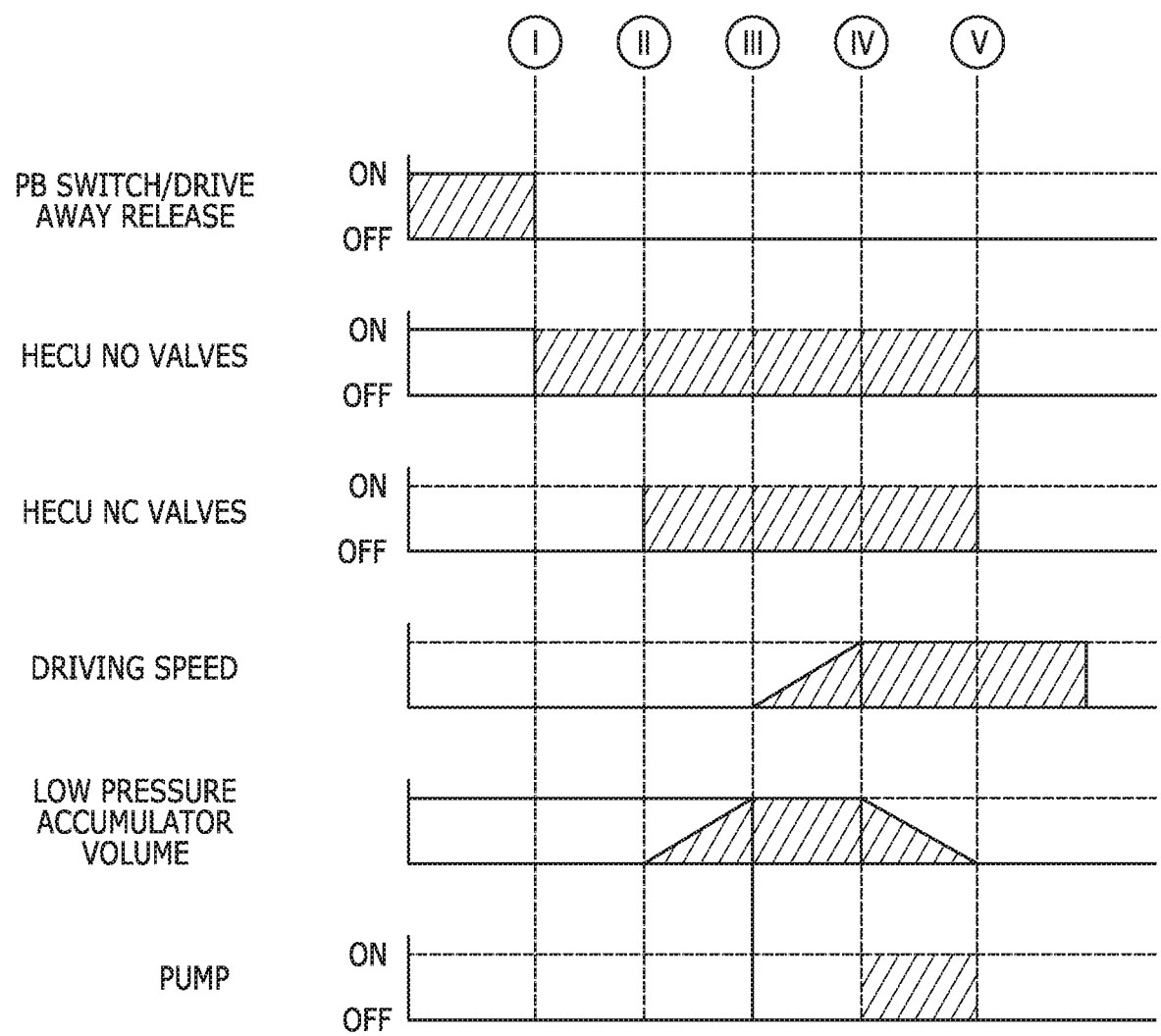
FIG. 2 is a diagram depicting the various components which are activated during the process of releasing the EPB, according to embodiments of the present invention.

Referring to FIG. 2, in Stage 1, the switch 24 is configured to be in the "on position," where the parking brake actuators 20A,20B are activated, such that force is applied to the discs 18A,18B. In this instance, activation of the actuators 20A, 20B is completed through use of the HECU 12 and the switch 24, therefore pressure within the fluid lines of the brake system 16A has not changed, i.e. there has been no pressure build up. The actuators 20A,20B "hold" (i.e., maintain clamping force) the brake units 14A,14B for as long as desired. When the command (i.e., the switch 24 is changed to the "off position") is given for the actuators 20A,20b release the discs 18A,18B, a pressure is built within the brake system 16A to build a pressure. This pressure may or may not be sufficient to hold the vehicle in a parked position, as the desired outcome of this process is brake release with a desirable air gap. However, building pressure in this manner generates a pressure differential between the calipers 22A,22B and the low-pressure accumulator 64. More specifically, after the switch 24 is changed to the "off position" at the end of Stage 1, a back pressure occurs in the rear brake system 16A because of the movement of the piston by the actuators 20A,20B in each caliper 22A,22B.

Therefore, at the beginning of Stage 2, the fluid in the calipers 22A,22B is pressurized. After the switch 24 is changed to the "off position," the third valve 60 and the sixth valve 70 are placed in a closed position, which is a "hold position" where pressurized fluid remains in the calipers 22A,22B. As explained above, the pressure accumulated may or may not be sufficient to actually hold the vehicle in a parked position. For an embodiment in which the pressure is not sufficient to hold the vehicle in a parked position, the duration of Stage 2 may be a minimal amount of time that is needed for switching the valves 60,70 to the desired positions.

In Stage 3, the fourth valve 62 and the fifth valve 68 are then placed in an open position. During this Stage, the third valve 60 and the sixth valve 70 remain in the closed position.

In Stage 4, because there is a pressure differential between the fluid in the calipers 22A,22B and fluid in the low-pressure accumulator 54 (i.e., the calipers 22A,22B have pressurized fluid, and the low-pressure accumulator 54 does not), fluid is drawn from the calipers 22A,22B into the low-pressure accumulator 54. This pressure differential causes the brake fluid in the first caliper 22A to be drawn from the first caliper 22A, through the first final conduit 72A, the fourth conduit 66 and the fifth valve 68, through a portion of the second conduit 40 and into the low-pressure accumulator 64. This pressure differential also causes the brake fluid in the second caliper 22B to be drawn from the second caliper 22B, through the second final conduit 72B, the third conduit 58 and the fourth valve 62, through a portion of the second conduit 40 and into the low-pressure accumulator 64.

The fluid in the low-pressure accumulator 54 may then be returned to the TMC 26 in Stage 5. In Stage 5, the first valve 36 is placed in a closed position, and the third valve 60, and the sixth valve 70 remain in the closed position. The second valve 38 is placed in an open position, and the fourth valve 62, and the fifth valve 68 remain in the open position. The pump 52 is activated, and the fluid in the low-pressure accumulator 64 is then drawn through the second conduit 40 past the check valve 44, into the third conduit 46, through the pump 52, where the fluid is then forced through the area of the third conduit 46 downstream of the pump 52 such that the fluid flows through the check valve 50, the accumulator 54, the restriction 56, and into the fourth conduit 66. The fluid then flows third conduit 58, through the second valve 38, through the first primary feed conduit 32A, and into the TMC 26.

The operation of the pump 52 also causes fluid to be drawn from each of the calipers 22A,22B. More specifically, fluid is drawn from the first caliper 22A, through the first final conduit 72A into fourth conduit 66 and through the fifth valve 68, where the fluid then flows into the second conduit 40. Fluid is also drawn from the second caliper 22B, through the second final conduit 72B and into the third conduit 58, where the fluid then flows through fourth valve 62, continues through the fifth conduit 58 and into the second conduit 40.

The transfer of the fluid from each of the brake calipers 22A,22B during the operation of the pump in Stage 5 causes the piston of each corresponding caliper 22A,22B and the brake pads 80A,80C that are connected to the piston of each corresponding caliper 22A,22B to retract, creating a gap between the first brake pad 80A and the disc 18A, and also creating a gap between the third brake pad 80C and the second disc 18B. The gap between the first brake pad 80A and the disc 18A, and the gap between the third brake pad 80C and the second disc 18B reduces or eliminates residual drag torque. The gap around each disc 18A,18B is balanced because of the rotation of each disc 18A,18B as the vehicle moves.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. An apparatus, comprising:
   a braking system, including:
      a hydraulic electronic control unit;

a switch in electrical communication with the hydraulic electronic control unit;

at least one brake unit operable for being controlled by the hydraulic electronic control unit;

at least one disc, the at least one brake unit including at least one caliper having a piston and brake pad operable for selectively applying a force to the at least one disc;

at least one actuator in electrical communication with the electronic control unit and the switch, the switch is able to be placed in a first position, where the at least one actuator is inactive, and the switch is able to be placed in a second position, such that the at least one actuator applies force to the at least one disc;

at least one low-pressure accumulator in fluid communication with the at least one brake unit; and a pump in fluid communication with the piston of the at least one brake unit and the at least one low-pressure accumulator;

wherein the piston of the at least one brake unit is exposed to pressurized fluid after the switch is changed from the second position to the first position, creating a pressure differential between the at least one brake unit and the low-pressure accumulator, causing fluid to be transferred to the low-pressure accumulator, the hydraulic electronic control unit then activates the pump, causing fluid to transfer away from the at least one brake unit and the at least one low-pressure accumulator to create a suction on the piston that moves the piston and brake pad away from the at least disc, creating a gap adjacent the at least one disc;

a pump accumulator in fluid communication on an outlet side of the pump and a restriction point in fluid communication of an outlet side of the pump accumulator; and a primary feed conduit in fluid communication with a first accumulator, a first valve and a second valve in fluid communication with the primary feed conduit, the first valve in further fluid communication with a second conduit and a second accumulator, the second valve in further fluid communication with a third conduit and a fourth conduit, wherein the pump, pump accumulator and the restriction point are disposed in the third conduit and the third conduit is in further fluid communication with the second conduit.

2. The apparatus of claim 1, wherein the at least one caliper applies force to the at least one disc when the switch is placed in the second position.

3. The apparatus of claim 2, wherein the at least one caliper releases the at least one disc when the switch is placed in the first position.

4. The apparatus of claim 1, wherein the gap is created as the least one brake pad moves away from the at least one disc as the fluid is transferred away from the at least one low-pressure accumulator and the at least one caliper.

5. The apparatus of claim 1, further comprising a master cylinder, wherein fluid is transferred from the at least one low-pressure accumulator and the at least one caliper to the master cylinder.

6. The apparatus of claim 1, wherein the gap around the at least one disc is balanced when the at least one disc is rotated, such that a gap is created on each side of the disc.

7. A braking system, comprising:
a hydraulic electronic control unit;
a switch in electrical communication with the hydraulic electronic control unit, the switch operable for being placed in a first position or a second position;

at least one brake unit operable for being controlled by the hydraulic electronic control unit, the at least one brake unit further comprising:
at least one actuator in electrical communication with the electronic control unit;
at least one disc, the actuator operable for selectively applying a force to the at least one disc;
at least one caliper including a piston operable for selectively applying a force to the at least one disc;
at least one brake pad connected to the at least one caliper, the least one brake pad selectively in contact with the at least one disc;

at least one low-pressure accumulator in fluid communication with the at least one caliper;

a pump in fluid communication with the piston of the at least one caliper and the at least one low-pressure accumulator;

wherein the piston of the at least one brake unit is exposed to pressurized fluid after the switch is changed from the second position to the first position and the at least one actuator releases the at least one disc, creating a pressure differential between the at least one low-pressure accumulator and piston of the at least one caliper, and the pressure differential causes fluid in the at least one caliper to be transferred to the at least one low-pressure accumulator, and the hydraulic electronic control unit then activates the pump, causing fluid to transfer away from the at least one caliper and the at least one low-pressure accumulator to create a suction on the piston that moves the piston and, the at least one brake pad away from the at least one disc, creating a gap between the at least one brake pad and the at least one disc;

a pump accumulator in fluid communication on an outlet side of the pump and a restriction point in fluid communication of an outlet side of the pump accumulator; and a primary feed conduit in fluid communication with a first accumulator, a first valve and a second valve in fluid communication with the primary feed conduit, the first valve in further fluid communication with a second conduit and a second accumulator, the second valve in further fluid communication with a third conduit and a fourth conduit, wherein the pump, pump accumulator and the restriction point are disposed in the third conduit and the third conduit is in further fluid communication with the second conduit.

8. The braking system of claim 7, further comprising a master cylinder, wherein fluid is transferred from the at least one low-pressure accumulator and the at least one caliper to the master cylinder during the operation of the pump.

9. The braking system of claim 8, further comprising a second brake pad located on the opposite side of the at least one disc in relation to the at least one brake pad, wherein as the at least one disc rotates, a portion of the gap is located between the second brake pad and the at least one disc.

10. A method for creating a desired air-gap in a braking system, comprising the steps of:
providing a hydraulic electronic control unit;
providing a switch in electrical communication with the hydraulic electronic control unit;
providing at least one brake unit including a piston that is operable for being controlled by the hydraulic electronic control unit;

providing at least one disc, the at least one brake unit operable for selectively applying a force to the at least one disc;

providing at least one actuator in electrical communication with the electronic control unit and the switch, the switch is able to be placed in a first position, and the switch is able to be placed in a second position;

providing at least one low-pressure accumulator in fluid communication with the at least one brake unit; and providing a pump in fluid communication with the at least one brake unit and the at least one low-pressure accumulator;

providing a pump accumulator in fluid communication on an outlet side of the pump and a restriction point in fluid communication of an outlet side of the pump accumulator providing a primary feed conduit m fluid communication with a first accumulator, a first valve and a second valve in fluid communication with the primary feed conduit, the first valve in further fluid communication with a second conduit and a second accumulator, the second valve in further fluid communication with a third conduit and a fourth conduit, wherein the pump, pump accumulator and the restriction point are disposed in the third conduit and the third conduit is in further fluid communication with the second conduit;

changing the switch from the second position to the first position such that the at least one brake unit is exposed to pressurized fluid, and a pressure differential is created between the at least one brake unit and the low-pressure accumulator, causing fluid to be transferred to the low-pressure accumulator; and activating the pump using the hydraulic electronic control unit, such that fluid is transferred away from the piston of the at least one brake unit and the at least one low-pressure accumulator to create a suction that moves the piston away at least one disk, creating a creating a gap adjacent the at least one disc.

11. The method of claim 10, further comprising the steps of:

providing at least one caliper being part of the at least one brake unit;

applying a force to the at least one disc using the at least one caliper when the switch is placed in the second position.

12. The method of claim 11, further comprising the steps of releasing the at least one disc using the at least one caliper when the switch is placed in the first position.

13. The method of claim 11, further comprising the steps of:

providing at least one brake pad connected to the at least one caliper;

creating the gap as the least one brake pad moves away from the at least one disc as the fluid is transferred away from the at least one low-pressure accumulator and the at least one caliper.

14. The method of claim 13, further comprising the steps of:

providing a master cylinder;

transferring fluid is from the at least one low-pressure accumulator and the at least one caliper to the master cylinder.

15. The method of claim 10, further comprising the steps of balancing the gap around the at least one disc when the at least one disc is rotated, such that a gap is created on each side of the disc.

* * * * *